United States Patent [19]

Blanton, Jr.

[11] 4,336,866
[45] Jun. 29, 1982

[54] WIRE ROPE LUBRICATOR CLEANER

[76] Inventor: Kistler J. Blanton, Jr., 628 S. Laurel St., Summerville, S.C. 29483

[21] Appl. No.: 114,783

[22] Filed: Jan. 24, 1980

[51] Int. Cl.³ .......................... B05B 1/04; F16N 7/14; F16N 9/00
[52] U.S. Cl. ........................... 184/15 R; 118/DIG. 18
[58] Field of Search ..... 184/15 R; 118/405, DIG. 11, 118/DIG. 18

[56] References Cited

U.S. PATENT DOCUMENTS

| | | | |
|---|---|---|---|
| 1,576,159 | 3/1926 | Timmerman | 184/15 R |
| 1,649,184 | 11/1927 | Posey | 184/15 R |
| 2,370,314 | 2/1945 | Jenner | 184/15 R |
| 2,578,260 | 12/1951 | McPherson et al. | 184/15 R |
| 3,811,406 | 5/1974 | Tomlinson | 118/405 X |
| 3,916,925 | 11/1975 | Crump | 184/15 R X |
| 3,951,235 | 4/1976 | Acerbi | 184/15 R |
| 4,169,427 | 10/1979 | Crump | 184/15 R X |

Primary Examiner—David H. Brown
Attorney, Agent, or Firm—Robert F. Beers; Robert W. Adams

[57] ABSTRACT

A wire rope lubricator cleaner for applying to a wire cable a lubricant cleaner, and removing from the wire cable excess lubricant cleaner so as to lubricate and clean the wire cable. A lubrication canister removably coupled to a rectangular shaped frame assembly applies the lubricant cleaner to the wire cable. A die rotatably mounted on an upper slide assembly of the rectangular shaped frame removes the excess lubricant from the cable and cleans the wire cable.

11 Claims, 5 Drawing Figures

WIRE ROPE LUBRICATOR CLEANER

The invention described herein may be manufactured and used by or for the Government of the United States of America for governmental purposes without the payment of any royalties thereon or therefor.

BACKGROUND OF THE INVENTION

1. Field of the Invention

This invention relates generally to lubricating and cleaning apparatus. In particular, this invention relates to an apparatus for supplying a lubricant cleaner to a wire cable so as to lubricate and clean the wire cable.

2. Description of the Prior Art

In many usages, multi-strand cable, also termed wire rope, becomes quite fouled by dirt, old grease, grime, and the like. The nature of the usage renders it impractical, or at least inconvenient, to remove the cable for cleaning and relubricating. Typical examples include bridge suspension cables, elevator suspension cables, well operating suspension cables, and heavy duty crane cables. Furthermore, where such multi-strand cable is exposed to weather or to water, it suffers deterioration from rust and corrosion unless protected by some suitable material such as, for example, oil or grease.

Numerous lubricating and cleaning devices have been utilized for cable cleaning and/or lubricating. Such devices of the prior art generally utilize a pumping apparatus to apply a lubricant cleaner to the wire cable, and either a brush assembly or a die to remove the excess lubricant from the wire cable and clean the cable. However, such devices of the prior art, while satisfactory for their intended purpose, ordinarily leave something to be desired in that they are complex in design, costly, cumbersome to use, and somewhat inefficient.

SUMMARY OF THE INVENTION

The subject invention overcomes some of the disadvantages of the prior art, including those mentioned above, in that it comprises a relatively simple wire rope lubricator cleaner which may be utilized to lubricate and clean a multi-strand wire cable passing therethrough.

The subject invention includes a rectangular shaped frame having a lubricating canister removably coupled thereto at one end thereof. At the opposite end of the rectangular shaped frame is an upper slide assembly which rotatably supports a die. The wire cable passes through the lubricating canister which applies a lubricant cleaner, and then to the die. The die, which has a plurality of internal spiral grooves adapted to fit the spiral strands of the wire cable, then cleans the wire cable and removes from the wire cable the excess lubricant cleaner applied thereto.

DESCRIPTION OF THE PREFERRED EMBODIMENT

Figure 1:
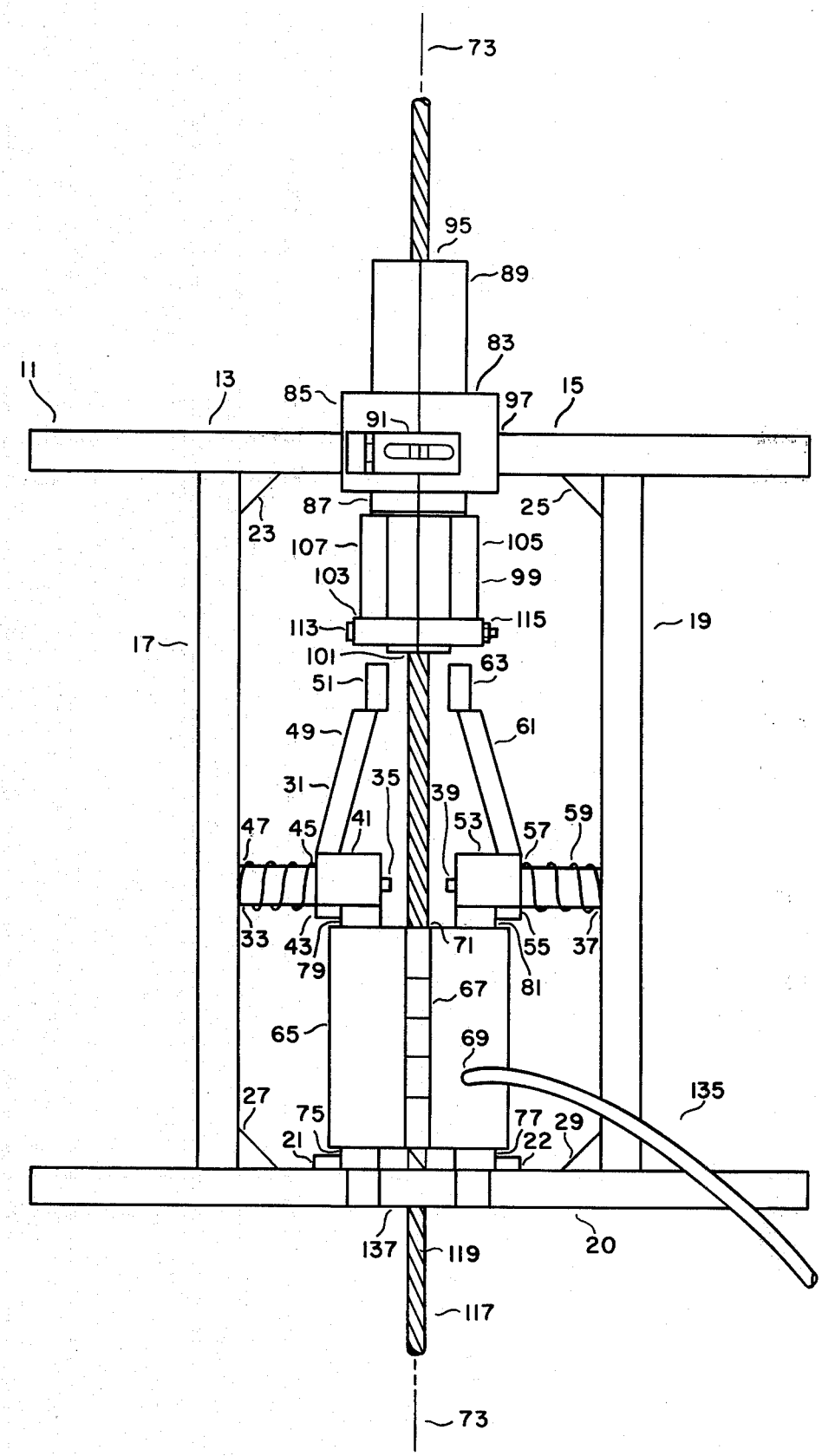
FIG. 1 is a schematic side view of the wire rope lubricator cleaner constituting the subject invention.

The preferred embodiment of the subject invention will now be discussed in some detail in conjuntion with all of the figures of the drawing, wherein like parts are designated by like reference numerals, insofar as it is possible and practical to do so.

Referring now to FIG. 1, there is shown a wire rope lubricator cleaner 11 comprising a rectangular shaped frame 13. Rectangular shaped frame 13 includes an upper rack handle assembly 15 fixedly attached to a pair of bracing bars 17 and 19. Fixedly attached to the opposite end of bracing bars 17 and 19 is a lower rack handle assembly 20 having a pair of mating members 21 and 22.

Rigidity of rectangular shaped frame 13 is provided by triangular support elements 23, 25, 27, and 29. Triangular support element 23 is positioned between upper rack handle assembly 15 and bracing bar 17, triangular support element 25 is positioned between upper rack handle assembly 15 and bracing bar 19, triangular support element 27 is positioned between lower rack handle assembly 20 and bracing bar 17, and triangular support element 29 is positioned between lower rack handle assembly 20 and bracing bar 19. Of course, triangular support elements 23, 25, 27, and 29 may be attached to rectangular frame assembly 13 by any suitable conventional means, for example by welds.

Affixed to bracing bars 17 and 19 of rectangular shaped frame 13 is a lower slide assembly 31. Lower slide assembly 31 includes a support bar 33 fixedly attached at one end thereof to bracing bar 17. A bumper element 35 is fixedly connected to the opposite end of support bar 33. A support bar 37 is fixedly attached at one end thereof to bracing bar 19. A bumper element 39 is fixedly connected to the opposite end of support bar 37.

A support block 41 having a mating member 43 and an aperture 45 extending therethrough is mounted around support bar 33 such that support block 41 is in slidable engagement with support bar 33. A spring 47 slidably mounted around support bar 33 between bracing bar 17 and support block 41 exerts a force upon support block 41 so as to push support block 41 against bumper element 35. A support rod 49 is attached at one end thereof to support block 41. Fixedly connected to the opposite end of support rod 49 is a tip element 51.

A support block 53 having a mating member 55 and an aperture 57 extending therethrough is mounted around support bar 37. A spring 59 slidably mounted around support bar 37 between bracing bar 19 and support block 53 exerts a force upon support block 53 so as to push support block 53 against bumper element 39. A support rod 61 is attached at one end thereof to support block 53. Fixedly connected to the opposite end of support rod 61 is a tip element 63.

A lubricating canister 65 having a strap hinge 67, an intake port 69, and an aperture 71 extending therethrough along a predetermined line 73 is removably coupled to rectangular shaped frame 13 so as to allow lubricating canister 65 to be removed therefrom. Mounted upon one end of lubricating canister 65 is a first pair of support members 75 and 77, each of which has a slot, not shown, therein. Mounted upon the opposite end of lubricating canister 65 is a second pair of support members 79 and 81, each of which has a slot, not shown, therein.

Mating members 21, 22, 43, and 55 are respectively in slidable engagement with the slots of support members 75, 77, 79, and 81 such that by moving support block 41 in the direction of bracing bar 17 and support block 53 in the direction of bracing bar 19, lubricating canister 65 may be removed from rectangular shaped frame 13.

An upper slide assembly 83 is mounted around upper rack handle assembly 15 in slidable engagement therewith. Upper slide assembly 83 includes a die support block 85 having a boss 87 fixedly connected to one side thereof and a sleeve 89 fixedly connected to the opposite side thereof. Mounted upon a third side of support block 85 is a toggle latch 91. Oppositely disposed from toggle latch 91, on a fourth side of die support block 85, is a toggle latch 93, FIG. 3. Upper slide assembly 83 has an aperture 95 extending clear through along predetermined line 73. Mounted through an aperture 97, which extends clear through die support block 85, is rack handle assembly 15. Toggle latches 91 and 93 when released allow upper slide assembly 83 to be separated along predetermined line 73 and slide upon upper rack handle assembly 15, as will be discussed more fully below.

Rotatably supported by boss 87 of upper slide assembly 83 is a die 99 having an aperture 101 extending therethrough and a flange 103. At this time it may be noteworthy to mention that die 99 is separable into die halves 105 and 107.

Figure 4:
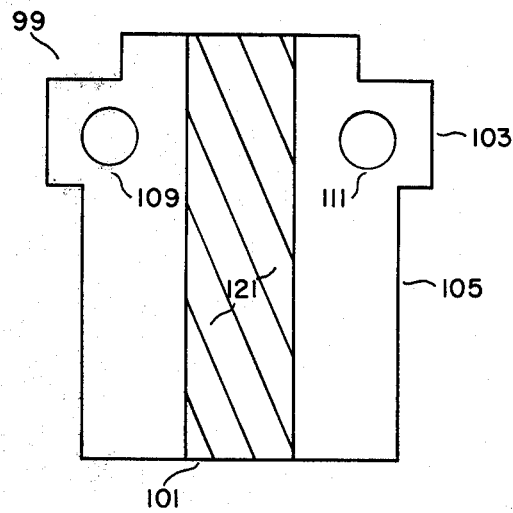
FIG. 4 is a cross-section view of the die of FIG. 1 taken substantially along line 73 of FIG. 1.

Referring now to FIGS. 1 and 4, there is shown flange 103 of die 99 having a pair of bolt holes 109 and 111 extending therethrough. A pair of bolts 113 inserted within bolt holes 109 and 111 of flange 103 and a pair of nuts 115 are utilized to fasten together die halves 105 and 107 around a wire cable 117 so as to form die 99.

Wire cable 117, which has a plurality of spiral stands 119, is passed through aperture 71 of lubricating canister 65, aperture 101 of die 99, and aperture 95 of upper slide assembly 83 along predetermined line 73.

Located within die 99 are a plurality of internal spiral grooves 121 fitting spiral strands 119 of wire cable 117 such that as wire cable 117 passes through die 99 from lower rack handle assembly 20 to upper rack handle assembly 15, die 99 will be rotated about boss 87 of upper slide assembly 83.

At this time it may be noted that whenever wire cable 117 is passed through die 99 in a direction opposite that discussed above, tip elements 51 and 63 of lower slide assembly 31 provide support for die 99.

Also, it may be noteworthy to mention that die 99 is a brass casting. Brass was utilized for die 99 because brass has excellent bearing characteristics, thereby allowing spiral strands 119 of wire cable 117 to pass freely through die 99.

Figure 2:
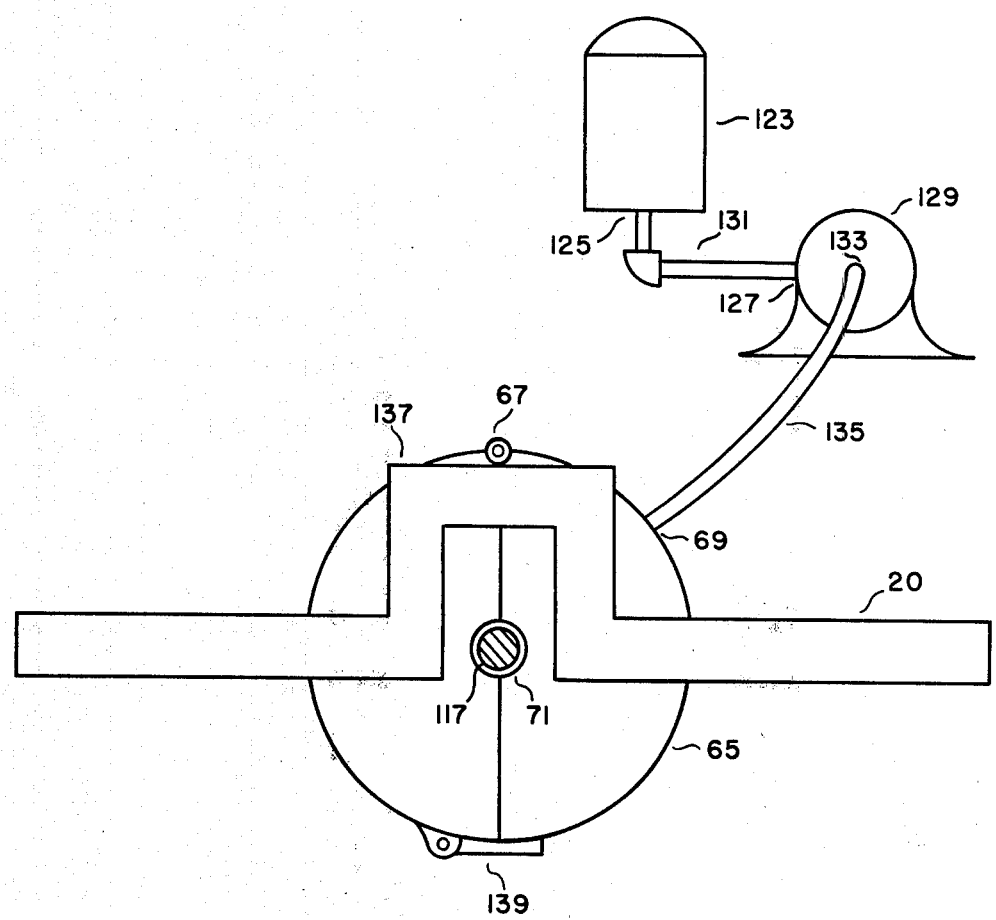
FIG. 2 is an end view of the lower rack handle assembly and lubricating canister of the wire rope lubricator cleaner of FIG. 1.
Figure 5:
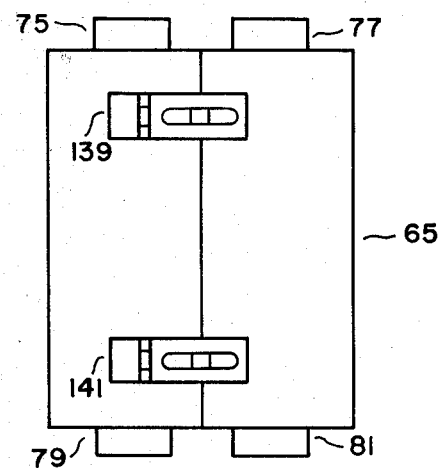
FIG. 5 is an elevation view of the lubrication canister of the wire rope lubricator cleaner of FIG. 1.

Referring now to FIGS. 1 and 2 and 5, there is shown a supply tank 123 having an output port 125. Output port 125 of supply tank 123 is connected to an intake port 127 of a pump 129 by a supply line 131. An output port 133 of pump 129 is connected to intake port 69 of lubricating canister 65 by a supply line 135. Supply tank 123 and pump 129 provide lubrication canister 65 with a lubricant cleaner, not shown, to be applied to wire cable 117 as wire cable 117 passes through lubrication canister 65, the details of which will be discussed more fully below.

Mounted upon the outer surface of lubricating canister 65 in diametrically opposed alignment from strap hinge 67 are a pair of toggle latches 139 and 149. Upon removing lubricating canister 65 from rectangular shaped frame 13 and then releasing toggle latches 139 and 141, lubricating canister 65 may be opened about strap hinge 67.

It may be noteworthy to mention at this time that lower rack handle assembly 20 has therein a centrally located U-shaped member 137 which allows wire cable 117 to pass through lower rack handle assembly 20.

Figure 3:
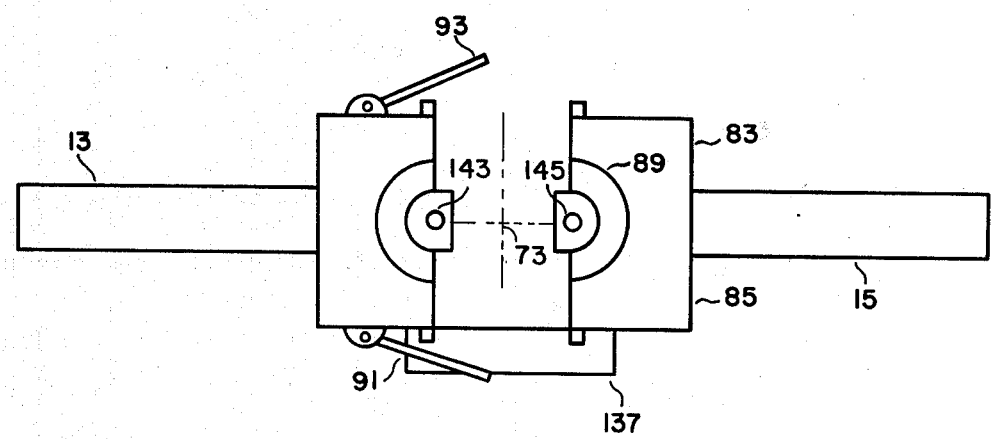
FIG. 3 is an end view of the upper rack handle assembly of the wire rope lubricator cleaner of FIG. 1.

Referring now to FIGS. 1 and 3, there is shown rectangular shaped frame 13 having lubricating canister 65 and die 99 removed therefrom. A pair of circular bumper elements 143 and 145, mounted upon upper rack handle assembly 15 of rectangular shaped frame 13, are utilized to prevent upper slide assembly 83 from shifting positions along upper rack handle assembly 15 when wire cable 117 passes through upper slide assembly 83.

It may be noteworthy to mention that upon releasing toggle latches 91 and 93, upper slide assembly 83 is separable about predetermined line 73, as shown in FIG. 3.

The operation of the invention will now be discussed briefly in conjunction with all of the figures of the drawings.

Referring now to FIGS. 1, 2, and 4, there is shown wire cable 117 passing through U-shaped member 137. Supply tank 123, which has stored therein the lubricant cleaner to be utilized in lubricating and cleaning wire cable 117, supplies to pump 129 the aforementioned lubricant cleaner. Pump 129, in turn, delivers to lubrication canister 65 under pressure the lubricant cleaner which is then applied by lubrication canister 65 to wire cable 117 as wire cable 117 passes therethrough.

The lubricant cleaner when applied to wire cable 117 acts as a solvent so as to dissolve any hardened residue which is present on wire cable 117, and as a lubricant so as to lubricate wire cable 117.

The lubricant cleaner applied by lubrication canister 65 to wire cable 117 may be any conventional, well known, and commercially available lubricant cleaner. In particular, it has been found that a lubricant cleaner designated Molub-alloy, manufactured by Imperial Oil and Grease, Inc., of Los Angeles, Calif., performs quite satisfactorily as the lubricant cleaner.

Wire cable 117 then passes through die 99 which removes from wire cable 117 the excess lubricant cleaner including the dissolved residue. As wire cable 117 passes through die 99, spiral strands 119 of wire cable 117, which fit internal spiral grooves 121 of die 99, rotate die 99 about boss 87 of upper slide assembly 83. The close fitting of wire cable 117 within die 99 allows for the retention on the surface of wire cable 117 of no more than the desired amount of lubricant.

At this time it may be noteworthy to mention that wire rope lubricator cleaner 11 may be employed to clean and lubricate wire cables, not shown, of various diameters. A plurality of dies, not shown, each of which has internal spiral grooves fitting the spiral strands of one of the aforementioned wire cables may be utilized within wire rope lubricator cleaner 11.

From the foregoing, it may readily be seen that the subject invention comprises a new, unique, and exceedingly useful wire rope lubricator which constitutes a considerable improvement over the known prior art. Obviously, many modifications and variations of the present invention are possible in light of the above teachings. It is, therefore, to be understood that within the scope of the appended claims, the invention may be practiced other than as specifically described.

We claim:

1. A wire rope lubricator comprising in combination:
   a rectangular shaped frame having a pair of substantially parallel bracing bars, an upper rack handle assembly attached to said pair of bracing bars at one end thereof, and a lower rack handle assembly attached to said pair of bracing bars at the opposite end thereof;
   a lower slide assembly affixed to the pair of parallel bracing bars of said rectangular shaped frame;
   lubricating means removably coupled to said rectangular shaped frame between said lower rack handle assembly and said lower slide assembly such that said lubricating means may be removed from said rectangular shaped frame, said lubricating means having an intake port, and an aperture for passing therethrough a wire cable so as to allow a lubricant cleaner to be applied to said wire cable;
   said wire cable having therein a plurality of spiral strands;
   an upper slide assembly mounted around said upper rack handle assembly in slidable engagement therewith, said upper slide assembly having an aperture for passing therethrough said wire cable; and
   reconditioning means rotatably supported by said upper slide assembly, said reconditioning means having a plurality of internal spiral grooves, the internal spiral grooves of said reconditioning means fitting the spiral strands of said wire cable so as to allow said wire cable to pass through said reconditioning means, said reconditioning means being adapted for cleaning said wire cable, and for removing the excess lubricant from said wire cable.

2. The wire rope lubricator cleaner according to claim 1, wherein said lower slide assembly comprises:
   a first support bar fixedly attached at one end thereof to the first of the pair of bracing bars of said rectangular shaped frame;
   a first bumper element fixedly connected to the opposite end of said first support bar;
   a second support bar fixedly attached at one end thereof to the second of the pair of bracing bars of said rectangular shaped frame;
   a second bumper element fixedly connected to the opposite end of said second support bar;
   a first support block slidably mounted upon said first support bar, said first support block having a support rod attached thereto;
   a second support block slidably mounted upon said second support bar, said second support block having a support rod attached thereto; and
   a pair of springs with the first of said pair of springs slidably mounted around said first support bar between the first of said pair of bracing bars and said first support block, and with the second of said pair of springs slidably mounted around said second support bar between the second of said pair of bracing bars and said second support block.

3. A wire rope lubricator cleaner according to claim 1, wherein said upper slide assembly comprises a die support block having a pair of apertures extending therethrough, the first of which is an substantial alignment with the aperture of said lubricating means, and the second of which is an alignment with and has mounted therein the first rack handle assembly of said rectangular shaped frame.

4. The wire rope lubricator cleaner according to claim 1, wherein said reconditioning means comprises a brass die.

5. The wire rope lubricator cleaner according to claim 1, further characterized by means having a supply line connected to the intake port of said lubricating means for providing said lubricating means with said lubricant cleaner.

6. The wire rope lubricator cleaner according to claim 5, wherein said means for providing said lubricating means with said lubricant cleaner comprises:
   a supply tank having an output port;
   a first supply line having one end thereof connected to the output port of said supply tank;
   a pump having an intake port effectively connected to the other end of said first supply line and an output port; and
   a second supply line effectively connected between the output port of said pump and the intake port of said lubricating means.

7. A lubricating and cleaning apparatus comprising in combination:
   a rectangular shaped frame having a pair of diametrically opposed parallel bars, an upper rack handle assembly attached to said pair of parallel bars at one end thereof, and a lower rack handle assembly attached to said pair of parallel bars at the opposite end thereof;
   a lower slide assembly affixed to the pair of parallel bars of said rectangular shaped frame;
   a lubrication canister removably coupled to said rectangular shaped frame between said lower rack handle assembly and said lower slide assembly such that said lubrication canister may be removed from said rectangular shaped frame, said lubrication canister having an intake port and an aperture for passing therethrough a wire cable so as to allow a lubricant cleaner to be applied to said wire cable;
   said wire cable having therein a plurality of wire strands;
   an upper slide assembly mounted around said upper rack handle assembly in slidable engagement therewith, said upper slide assembly having an aperture for passing therethrough said wire cable; and
   a die rotatably supported by said upper slide assembly, said die having a plurality of internal spiral grooves, the internal spiral grooves of said die fitting the spiral strands of said wire cable so as to allow said wire cable to pass through said die, said die being adapted for cleaning said wire cable, and for removing the excess lubricant cleaner from said wire cable.

8. The lubrication and cleaning apparatus according to claim 7, further characterized by a pumping apparatus having a line connected to the intake port of said lubrication canister for supplying to said lubrication canister said lubricant cleaner.

9. The lubrication and cleaning apparatus according to claim 7, wherein said lower slide assembly comprises:
   a first support bar fixedly attached at one end thereof to the first of the pair of parallel bars of said rectangular shaped frame;
   a first bumper element fixedly connected to the opposite end of said first support bar;
   a second support bar fixedly attached at one end thereof to the second of the pair of parallel bars of said rectangular shaped frame;
   a second bumper element fixedly connected to the opposite end of said second support bar;

a first support block slidably mounted upon said first support bar, said first support block having a support rod affixed thereto;

a second support block slidably mounted upon said second support bar, said second support block having a support rod affixed thereto; and a pair of springs with the first of said pair of springs slidably mounted upon said first support bar between the first of said pair of parallel bars and said first support block, and with the second of said pair of springs slidably mounted upon said second support bar between the second of said pair of parallel bars and said second support block.

10. The lubricating and cleaning apparatus according to claim 7, wherein said upper slide assembly comprises a die support block having a pair of apertures extending therethrough, the first of which is in substantial alignment with the aperture of said lubricating canister, and the second of which is an alignment with and has mounted therein the first rack handle assembly of said rectangular shaped frame.

11. The lubricating and cleaning apparatus according to claim 1, wherein said die comprises a brass die.

* * * * *

UNITED STATES PATENT AND TRADEMARK OFFICE
CERTIFICATE OF CORRECTION

PATENT NO. : 4,336,866
DATED : June 29, 1982
INVENTOR(S) : Kistler J. Blanton, Jr.

It is certified that error appears in the above-identified patent and that said Letters Patent are hereby corrected as shown below:

On the Title page:

The inventor line is changed to include as a co-inventor:

-- Harold B. Crosby
113 Pine Street
Walterboro, S. C. 29488 --.

Signed and Sealed this

Fifth Day of October 1982

[SEAL]

Attest:

GERALD J. MOSSINGHOFF

Attesting Officer    Commissioner of Patents and Trademarks